United States Patent
Nihongi et al.

(10) Patent No.: US 10,077,698 B2
(45) Date of Patent: Sep. 18, 2018

(54) SELECTIVE CATALYTIC REDUCTION SYSTEM, SELECTIVE CATALYTIC REDUCTION SENSOR, AND LEVEL SENSOR

(71) Applicant: ISUZU MOTORS LIMITED, Tokyo (JP)

(72) Inventors: Shigeru Nihongi, Yokohama (JP); Takeshi Fukuoka, Chigasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/029,463

(22) PCT Filed: Oct. 17, 2014

(86) PCT No.: PCT/JP2014/077694
§ 371 (c)(1),
(2) Date: Apr. 14, 2016

(87) PCT Pub. No.: WO2015/060215
PCT Pub. Date: Apr. 30, 2015

(65) Prior Publication Data
US 2016/0273429 A1    Sep. 22, 2016

(30) Foreign Application Priority Data

Oct. 25, 2013  (JP) ................. 2013-222251

(51) Int. Cl.
*F01N 3/00* (2006.01)
*F01N 3/20* (2006.01)
(Continued)

(52) U.S. Cl.
CPC .......... *F01N 3/208* (2013.01); *F01N 3/2066* (2013.01); *F01N 9/00* (2013.01); *F01N 11/00* (2013.01);
(Continued)

(58) Field of Classification Search
USPC .................. 60/274, 286, 295, 297, 301, 303
See application file for complete search history.

(56) References Cited

U.S. PATENT DOCUMENTS 8,509,983 B2 *   8/2013   King ...................... F01N 3/2066
                                                              60/274
9,080,490 B2 *   7/2015   Itou ......................... F01N 3/103
(Continued)

FOREIGN PATENT DOCUMENTS

DE    102012001580    8/2013
JP    57-117082    7/1982
(Continued)

OTHER PUBLICATIONS

Espacenet Bibliographic data, Publication No. 5-223619, published Aug. 31, 1993.
(Continued)

*Primary Examiner* — Binh Q Tran
(74) *Attorney, Agent, or Firm* — Staas & Halsey LLP (57) ABSTRACT

A selective catalytic reduction system includes a selective catalytic reduction device on an exhaust pipe of an engine, a urea solution tank that stores a urea solution, a float-type urea solution level sensor in the urea solution tank, a dosing valve on the exhaust pipe upstream of the selective catalytic reduction device, a urea solution injection control section that controls an amount of urea solution to be injected through the dosing valve in accordance with an amount of NOx discharged from the engine, an inclination sensor that detects an inclination angle of the urea solution tank relative to horizontal, and an inclination angle correcting section that corrects a liquid level of the urea solution, the liquid level being detected by a detection unit from the position of a float, with the inclination angle detected by the inclination sensor.

19 Claims, 5 Drawing Sheets

(51) Int. Cl.
*F01N 9/00* (2006.01)
*F01N 11/00* (2006.01)

(52) U.S. Cl.
CPC ...... *F01N 2550/05* (2013.01); *F01N 2610/02* (2013.01); *F01N 2610/146* (2013.01); *F01N 2610/1406* (2013.01); *F01N 2610/148* (2013.01); *F01N 2900/0416* (2013.01); *F01N 2900/10* (2013.01); *F01N 2900/1814* (2013.01); *Y02T 10/24* (2013.01); *Y02T 10/47* (2013.01)

(56) References Cited

U.S. PATENT DOCUMENTS

| | | | |
|---|---|---|---|
| 2007/0266703 A1 | 11/2007 | Hirata et al. | |
| 2008/0276598 A1 | 11/2008 | Gresens | |
| 2009/0301059 A1 | 12/2009 | Toshioka et al. | |
| 2010/0037599 A1 | 2/2010 | Toshioka et al. | |
| 2013/0064716 A1 | 3/2013 | Fukuoka et al. | |
| 2013/0160433 A1* | 6/2013 | Schepers | G01F 23/00 60/295 |
| 2014/0182274 A1* | 7/2014 | Toukairin | F01N 3/208 60/287 |
| 2015/0000396 A1* | 1/2015 | Maguin | F01N 3/2066 73/290 V |
| 2015/0019108 A1* | 1/2015 | Hendrickson | F01N 11/00 701/102 |
| 2016/0169728 A1* | 6/2016 | Romstoeck | G01F 23/0061 702/55 |
| 2016/0348555 A1* | 12/2016 | Tsuchiya | F01N 3/208 |

FOREIGN PATENT DOCUMENTS

| | | |
|---|---|---|
| JP | 5-223619 | 8/1993 |
| JP | 5-286696 | 11/1993 |
| JP | 2000-313240 | 11/2000 |
| JP | 2006-250117 | 9/2006 |
| JP | 2008-274765 | 11/2008 |
| JP | 2008-281006 | 11/2008 |
| JP | 2008-291828 | 12/2008 |
| JP | 2009-42131 | 2/2009 |
| JP | 2010-151094 | 7/2010 |
| JP | 5255427 | 7/2010 |
| JP | 2011-247137 | 12/2011 |
| WO | 2015/097526 | 7/2015 |

OTHER PUBLICATIONS

Espacenet Bibliographic data, Publication No. 5255427, published Jul. 15, 2010.
Espacenet Bibliographic data, Publication No. 2010-151094, published Jul. 8, 2010.
Espacenet Bibliographic data, Publication No. 2000-313240, published Nov. 14, 2000.
Espacenet Bibliographic data, Publication No. 2009-42131, published Feb. 26, 2009.
Espacenet Bibliographic data, Publication No. 5-286696, published Nov. 2, 1993.
International Search Report dated Dec. 16, 2014, in corresponding International Application No. PCT/JP2014/077694.
International Preliminary Report on Patentability dated Apr. 26, 2016 in corresponding International Patent Application No. PCT/JP2014/077694.
Extended European Search Report for corresponding European Patent Application No. 14855819.0, dated May 4, 2017.
English Abstract for DE 102012001580, dated Aug. 1, 2013.

* cited by examiner

LEVEL OF
LIQUID SURFACE
WHEN
HORIZONTAL (a)                    (b)

SELECTIVE CATALYTIC REDUCTION SYSTEM, SELECTIVE CATALYTIC REDUCTION SENSOR, AND LEVEL SENSOR

CROSS-REFERENCE TO RELATED APPLICATIONS

This application is a U.S. National Stage Application, which claims the benefit under 35 U.S.C. § 371 of PCT International Patent Application No. PCT/JP2014/077694, filed Oct. 17, 2014, which claims the foreign priority benefit under 35 U.S.C. § 119 of Japanese Patent Application No. 2013-222251, filed Oct. 25, 2013, the contents of which are incorporated herein by reference.

TECHNICAL FIELD

The present invention relates to a selective catalytic reaction ("SCR") system, an SCR sensor, and a level sensor.

BACKGROUND ART

An SCR system that includes an SCR device is developed as an exhaust gas purification system for purifying NOx contained in exhaust gas of a diesel engine.

In such an SCR system, a urea solution stored in a urea solution tank is supplied to an upstream side of the SCR device in an exhaust gas passage to generate ammonia, and NOx is reduced by this ammonia in the SCR device for purification of the exhaust gas.

The SCR system includes an SCR sensor that has a float urea solution level sensor provided in the urea solution tank. The float urea solution level sensor includes a float that follows the liquid surface of the urea solution in the urea solution tank, and a detecting unit that detects the position of the float to detect the level of the liquid surface of the urea solution stored in the urea solution tank. Thus, the SCR system can detect a remaining amount of the urea solution.

The liquid surface of the urea solution is not stable while a vehicle is running Therefore, the SCR system is configured to detect the level of the liquid surface of the urea solution while the vehicle is not running (when the key switch is turned on or when the key switch is turned off) in order to accurately measure the level of the liquid surface of the urea solution.

Prior art document information related to the invention of this application includes the following:

LISTING OF REFERENCES

Patent Literature Document 1: Japanese Patent Application Laid-Open Publication (Kokai) No. 2011-247137
Patent Literature Document 3: Japanese Patent Application Laid-Open Publication (Kokai) No. 2008-291828
Patent Literature Document 4: Japanese Patent Application Laid-Open Publication (Kokai) No. 5-223619
Patent Literature Document 5: Japanese Patent No. 5255427

When the vehicle is inclined (e.g., when the vehicle is parked partially on the sidewalk or the like), however, the urea solution tank is inclined relative to the horizontal plane. This may result in a problem in that the level of the liquid surface of the urea solution to be detected by the level sensor may not be detected accurately.

The level of the liquid surface of the urea solution is also used, for example, to make a determination as to a consumption amount abnormality by comparing an instructed injection amount of the urea solution to an actually injected amount of the urea solution. Thus, various problems may arise when the level of the liquid surface of the urea solution cannot be detected accurately.

Although a method is also known in which a mean value of the levels of the liquid surface measured in a predetermined period of time is used, this method cannot be applied when a vehicle in which the level of the liquid surface of the urea solution is to be measured is parked, i.e., when the level of the liquid surface does not fluctuate.

SUMMARY OF THE INVENTION

Accordingly, an object of the present invention is to provide an SCR system, an SCR sensor, and a level sensor that solve the above-described problems and can detect the level of the liquid surface accurately even when a tank is inclined.

The present invention has been made to achieve the above-mentioned object, and an aspect of the present invention provides an SCR system that includes a selective catalytic reduction device provided on an exhaust pipe of an engine, a urea solution tank configured to store (reserve) a urea solution, a float urea solution level sensor provided in the urea solution tank, and including a float configured to follow a liquid surface of the urea solution in the urea solution tank and a detecting unit configured to detect a position of the float to detect a level of the liquid surface of the urea solution stored in the urea solution tank, a dosing valve provided on the exhaust pipe upstream of the selective catalytic reduction device and configured to inject the urea solution, and a urea solution injection controlling unit configured to control an injection amount of the urea solution injected through the dosing valve in accordance with an amount of NOx emitted from the engine. The SCR system also includes an inclination sensor configured to detect an angle of inclination of the urea solution tank relative to a horizontal plane, and an inclination correcting unit configured to correct the level of the liquid surface of the urea solution, which is detected by the detecting unit on the basis of the position of the float, with the angle of inclination detected by the inclination sensor.

The SCR system may further include an inclination abnormality determining unit configured to determine that inclination is abnormal when the angle of inclination detected by the inclination sensor is greater than a preset threshold angle.

The SCR system may further include a cumulative instructed injection amount calculating unit configured to obtain a cumulative instructed injection amount, which is a cumulative value of instructed injection amounts of the urea solution instructed by the urea solution injection controlling unit. The SCR system may further include an actual injection amount calculating unit configured to obtain an actually injected amount of the urea solution on the basis of the level of the liquid surface of the urea solution corrected by the inclination correcting unit. The SCR system may further include a consumption amount abnormality determining unit configured to determine that a consumption amount is abnormal when a deviation of the actually injected amount from the cumulative instructed injection amount is greater than a predetermined value.

Another aspect of the present invention provides an SCR sensor that includes a float urea solution level sensor provided in a urea solution tank that stores a urea solution. The urea solution is used to purify exhaust gas of an engine. The urea solution level sensor has a float configured to follow a liquid surface of the urea solution in the urea solution tank, and a detecting unit configured to detect a position of the float to detect a level of the liquid surface of the urea solution stored in the urea solution. The SCR sensor also include an inclination sensor configured to detect an angle of inclination of the urea solution tank relative to a horizontal plane, and an inclination correcting unit configured to correct the level of the liquid surface of the urea solution, which is detected by the detecting unit on the basis of the position of the float, with the angle of inclination detected by the inclination sensor.

Still another aspect of the present invention provides a float level sensor that includes a float provided in a tank. The tank is used to store a liquid. The float is configured to follow a liquid surface of the liquid in the tank. The float level sensor also include a detecting unit configured to detect a position of the float to detect a level of the liquid surface of the liquid stored in the tank. The float level sensor also includes an inclination sensor configured to detect an angle of inclination of the tank relative to a horizontal plane, and an inclination correcting unit configured to correct the level of the liquid surface of the liquid, which is detected by the detecting unit on the basis of the position of the float, with the angle of inclination detected by the inclination sensor.

The present invention provides an SCR system, an SCR sensor, and a level sensor that can detect the level of the liquid surface accurately even when a tank is inclined.

Embodiments of the present invention will be described with reference to the appended drawings.

Figure 1:
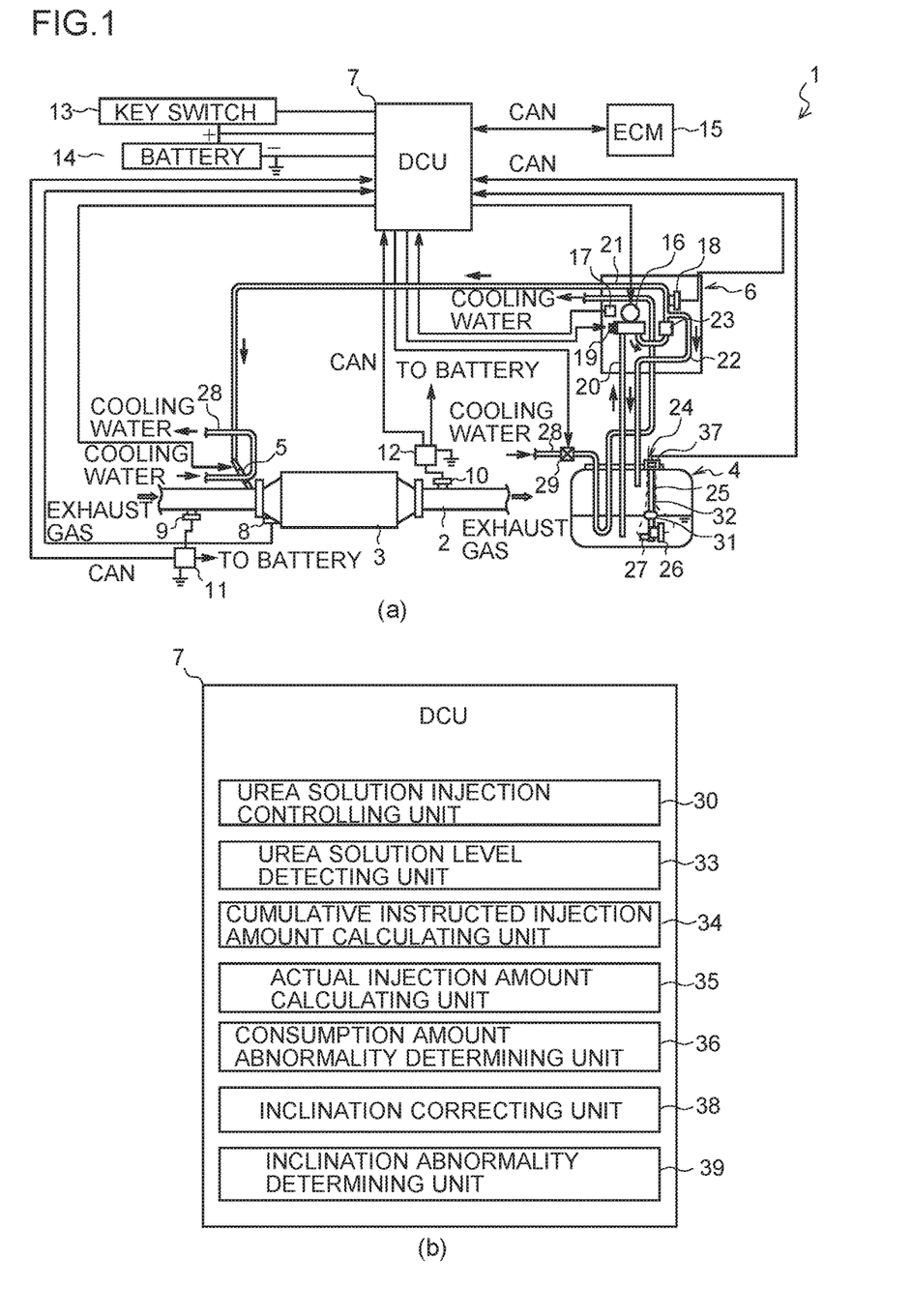
FIGS. 1(a) and 1(b) are schematic configuration diagrams of an SCR system according to an embodiment of the present invention.

FIGS. 1(a) and 1(b) are schematic configuration diagrams of an SCR system according to an embodiment of the present embodiment.

As illustrated in FIGS. 1(a) and 1(b), an SCR system 1 primarily includes an SCR device 3 provided on an exhaust pipe 2 of an engine (not illustrated), a urea solution tank 4 for storing a urea solution, a dosing valve (urea solution injection device) 5 that is provided on the exhaust pipe 2 upstream of the SCR device 3 to inject the urea solution, a supply module 6 that supplies the urea solution to the dosing valve 5 from the urea solution tank 4, and a dosing control unit (DCU) 7 that controls the dosing valve 5, the supply module 6, and relevant components.

The dosing valve 5 has a structure in which an injection port is provided in a cylinder filled with a high-pressure urea solution and a valve body for closing the injection port is attached to a plunger. As electricity is passed to a coil, the plunger is lifted to move the valve body away from the injection port, and thus the urea solution is injected. When the passing of electricity to the coil is stopped, the plunger is pulled downward by the spring force thereinside, and the valve body closes the injection port. Thus, the injection of the urea solution is stopped.

An exhaust gas temperature sensor 8 for measuring the temperature of exhaust gas at an inlet of the SCR device 3 is provided on the exhaust pipe 2 upstream of the SCR device 3, and an output signal line of the exhaust gas temperature sensor 8 is connected to the DCU 7. An upstream NOx sensor 9 for detecting the NOx concentration at the upstream side of the SCR device 3 is provided on the exhaust pipe 2 upstream of the SCR device 3. A downstream NOx sensor 10 for detecting the NOx concentration at the downstream side of the SCR device 3 is provided on the exhaust pipe 2 downstream of the SCR device 3. NOx sensor modules 11 and 12 for controlling the NOx sensors 9 and 10, respectively, are connected to the NOx sensors 9 and 10, and the NOx sensor modules 11 and 12 are connected to the DCU 7 via a controller area network (CAN).

The DCU 7 is connected to a key switch (ignition switch) 13 and a battery 14. The DCU 7 is also connected, via the CAN, to an engine control module (ECM) 15 that controls the engine.

The supply module (SM) 6 includes an SM pump 16 for pressurizing and feeding the urea solution, an SM temperature sensor 17 for measuring the temperature of the supply module 6, a urea solution pressure sensor 18 for measuring the pressure of the urea solution in the supply module 6 (i.e., the pressure at the discharge side of the SM pump 16), and a reverting valve 19 for switching between supplying the urea solution from the urea solution tank 4 to the dosing valve 5 and returning the urea solution from the dosing valve to the urea solution tank 4. Output signal lines of the SM temperature sensor 17 and the urea solution pressure sensor 18 are connected to the DCU 7, and input signal lines of the SM pump 16 and the reverting valve 19 are connected to the DCU 7.

When the reverting valve 19 has been switched to supply the urea solution to the dosing valve 5, the supply module 6 causes the SM pump 16 to suck up the urea solution from the urea solution tank 4 through a liquid-feed line (suction line) 20, supply the urea solution to the dosing valve 5 via a pressure-feed line (pressure line) 21, and return any excess urea solution to the urea solution tank 4 via a recovery line (back line) 22. A filter 23 is disposed in the pressure-feed line 21.

A cooling water line 28 for circulating cooling water to cool the engine is connected to the urea solution tank 4 and the supply module 6. The cooling water line 28 passes through the urea solution tank 4, in which heat is exchanged between the cooling water and the urea solution. The cooling water line 28 also passes through the supply module 6, in which heat is exchanged between the cooling water and the supply module 6.

A tank heater valve 29 is disposed on the cooling water line 28, which passes through the urea solution tank 4 and the supply module 6, for switching between introducing and not introducing the cooling water into the urea solution tank 4 and the supply module 6. An input signal line of the tank heater valve 29 is connected to the DCU 7. Signals may be sent between the DCU 7 and other members via signal lines or via the CAN.

The cooling water line 28 is connected to the dosing valve 5 as well. The cooling water is supplied to the dosing valve 5 regardless of whether the tank heater valve 29 is open or closed.

The DCU 7 includes a urea solution injection controlling unit 30 that controls an amount of urea solution to be injected through the dosing valve 5 in accordance with an amount of NOx emitted from the engine. The urea solution injection controlling unit 30 estimates the amount of NOx contained in the exhaust gas on the basis of engine parameters obtained from the ECM 15 and the temperature of the exhaust gas obtained from the exhaust gas temperature sensor 8, and determines the amount of urea solution to be injected through the dosing valve 5 on the basis of the estimated amount of NOx. When the urea solution is injected in the determined amount through the dosing valve 5, the urea solution injection controlling unit 30 controls the dosing valve 5 on the basis of the value detected by the upstream NOx sensor 9 to adjust the amount of the urea solution to be injected through the dosing valve 5.

The urea solution tank 4 has an SCR sensor 24 attached thereto. The SCR sensor 24 includes a urea solution level sensor (hereinafter simply referred to as "level sensor") 25 for measuring the level of the liquid surface (level) of the urea solution in the urea solution tank 4, a temperature sensor 26 for measuring the temperature of the urea solution in the urea solution tank 4, and a quality sensor 27 for measuring the quality of the urea solution in the urea solution tank 4. The quality sensor 27 detects, for example, the concentration of the urea solution and/or whether a heterogeneous mixture is mixed in the urea solution on the basis of the propagation speed of an ultrasonic wave or the electric conductivity, and determines the quality of the urea solution in the urea solution tank 4.

The level sensor 25 is a float level sensor that includes a float 31 and a detecting unit 32. The float 31 is configured to follow the liquid surface of the urea solution in the urea solution tank 4. The detecting unit 32 is configured to detect the position of the float 31 to detect the level of the liquid surface of the urea solution stored in the urea solution tank 4.

The float 31 is formed into a hollow cylindrical shape and has magnets. The detecting unit 32 includes a pipe to be disposed inside the hollow portion of the float 31 and reed switches provided along the longitudinal direction of the pipe at predetermined intervals. The contacts of the reed switches are closed by the magnets provided on the float 31. Detecting a reed switch whose contact is closed allows the position (height-wise position) of the float 31 to be detected. It should be noted that the configuration of the detecting unit 32 is not limited to the above-described configuration.

The DCU 7 includes a urea solution level detecting unit 33 that obtains the level of the liquid surface of the urea solution stored in the urea solution tank 4 on the basis of a signal from the detecting unit 32.

The DCU 7 also includes a cumulative instructed injection amount calculating unit 34 that obtains a cumulative amount of instructed injection, which is a cumulative value of the instructed injection amounts of the urea solution instructed by the urea solution injection controlling unit 30. The DCU 7 also includes an actual injection amount calculating unit 35 that obtains an actually injected amount of the urea solution on the basis of the level of the liquid surface of the urea solution. The DCU 7 also includes a consumption amount abnormality determining unit 36 that determines that the consumption amount is abnormal when the deviation of the actually injected amount from the cumulative instructed injection amount is greater than a predetermined value.

In this embodiment, the consumption amount abnormality determining unit 36 is configured to determine that the consumption amount is abnormal when a cumulative instructed injection amount P calculated by the cumulative instructed injection amount calculating unit 34 has reached or exceeded a preset determination amount Pth.

The SCR system 1 of this embodiment also includes an inclination sensor 37 for detecting an angle of inclination of the urea solution tank 4 relative to the horizontal plane, and an inclination correcting unit 38 that corrects the level of the liquid surface of the urea solution, which is detected by the detecting unit 32 on the basis of the position of the float 31, in accordance with the angle of inclination detected by the inclination sensor 37.

The level sensor 25 is disposed at a position offset from the center position C of the urea solution tank 4 as viewed from the above. The inclination sensor 37 is configured to detect the angle of inclination relative to the horizontal plane in the direction in which the level sensor 25 is offset, i.e., in the direction extending from the center position of the urea tank 4 to the center position of the level sensor 25 as viewed from the above. In this embodiment, the inclination sensor 37 is disposed on the upper portion of the urea solution tank 4. It should be noted that the position at which the inclination sensor 37 is provided is not limited thereto. For example, the inclination sensor 37 may be provided, for example, on another member that inclines along with the urea solution tank 4.

Figure 2:
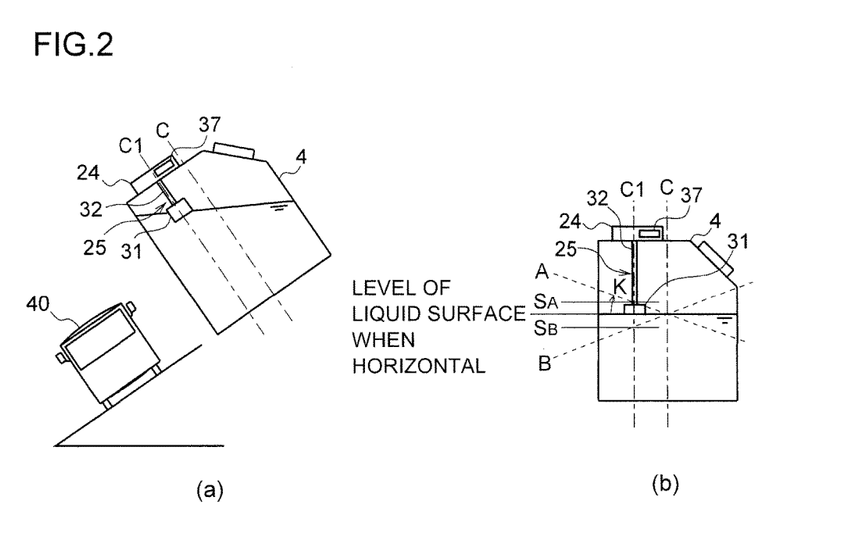
FIGS. 2(a) and 2(b) are views useful to describe how the level of the liquid surface to be detected differs depending on the angle of inclination in an embodiment of the present invention.

As illustrated in FIG. 2(a), the level sensor 25 is disposed at a position C1 that is offset from the center position C of the urea solution tank 4. In this arrangement, the accurate level of the liquid surface cannot be detected when a vehicle 40 is inclined since the urea solution tank 4 is inclined relative to the horizontal plane.

As illustrated in FIG. 2(b), even if the level of the liquid surface of the urea solution is constant when the urea solution tank 4 is disposed horizontally, a level $S_A$ of the liquid surface, which is higher than the level held when the urea solution tank 4 is disposed horizontally, is detected when the urea solution tank 4 is inclined in the counter-clockwise direction in the drawing such that the liquid surface lies along the position A. A level $S_B$ of the liquid surface, which is lower than the level held when the urea solution tank 4 is disposed horizontally, is detected when the urea solution tank 4 is inclined in the clockwise direction in the drawing such that the liquid surface lies along the position B. Thus, an error occurs in either case.

The error of the level of the liquid surface when the urea solution tank 4 is inclined relative to the level of the liquid surface when the urea solution tank 4 is disposed horizontally varies with an angle K of inclination. Therefore, in this embodiment, the angle K of inclination relative to the horizontal plane in the direction in which the level sensor 25 is offset from the center position C of the urea solution tank 4 is detected by the inclination sensor 37, and the level of the liquid surface when the urea solution tank 4 is inclined is corrected in accordance with the detected angle K of inclination. Thus, the level of the liquid surface when the urea solution tank 4 is disposed horizontally is estimated.

Specifically, the corrected level S' of the liquid surface (i.e., the level of the liquid surface when the urea solution tank 4 is disposed horizontally) is obtained by Expression (1), where S represents the level of the liquid surface prior to the correction, and K represents the angle of inclination.

$$S'=S+K\times\alpha \quad (1)$$

In Expression (1), $\alpha$ is a correction coefficient that is determined by the position or the like of the level sensor 25.

The actual injection amount calculating unit 35 is configured to obtain the actually injected amount of urea solution on the basis of the level of the liquid surface of the urea solution corrected by the inclination correcting unit 38.

When the angle K of inclination detected by the inclination sensor 37 is excessively large, there is a possibility of the inclination sensor 37 malfunctioning or being mounted improperly. Therefore, the SCR system 1 also includes an inclination abnormality determining unit 39 that determines that the inclination is abnormal when the angle K of inclination detected by the inclination sensor 37 is greater than a preset threshold angle Kth. In this embodiment, the inclination abnormality determining unit 39 is configured to determine that the inclination is abnormal when the number of times the angle K of inclination is determined to be greater than the threshold angle Kth exceeds a predetermined count.

The control process of the SCR system 1 will now be described.

Figure 3:
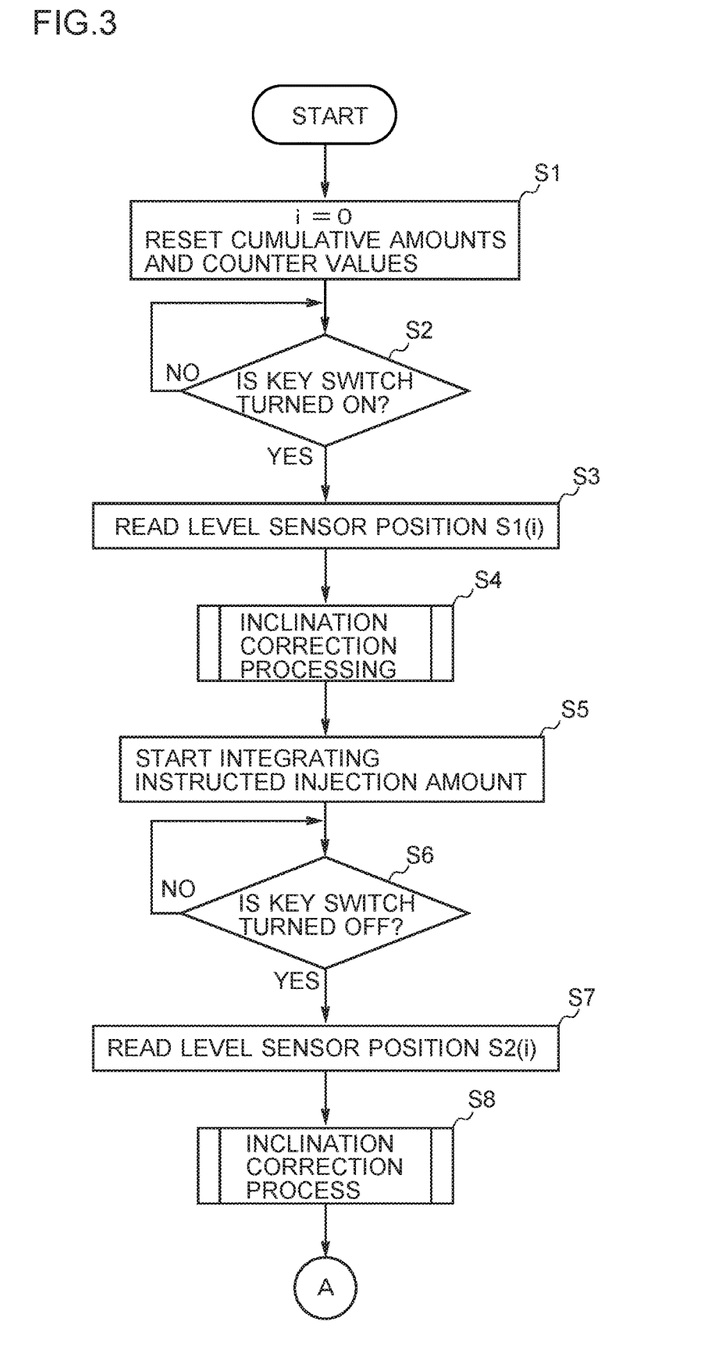
FIG. 3 is a flowchart illustrating a control process to be carried out by the SCR system shown in FIG. 1.

As illustrated in FIG. 3, 0 is substituted into i in Step S1, and the cumulative amounts and the counter values are reset to their initial states. In Step S2, the SCR system 1 stands by until the key switch 13 is turned on. Upon turning on of the key switch 13, the processing proceeds to Step S3, and the level sensor 25 reads a level sensor position $S1(i)$, i.e., the level of the liquid surface of the urea solution. In Step S4, processing of inclination correction is carried out. The details of the processing of the inclination correction will be described later.

In Step S5, the cumulative instructed injection amount calculating unit 34 starts integrating the instructed injection amount. In Step S6, the SCR system 1 stands by until the key switch 13 is turned off. Upon turning off of the key switch 13, a level sensor position $S2(i)$ is read in Step S7. The inclination correction is carried out in Step S8. The level of the liquid surface of the urea solution is measured when the key switch 13 is turned on or turned off because it is believed that the vehicle is stopped when the key switch 13 is turned on or turned off, and the level of the liquid surface of the urea solution can be measured accurately.

Figure 4:
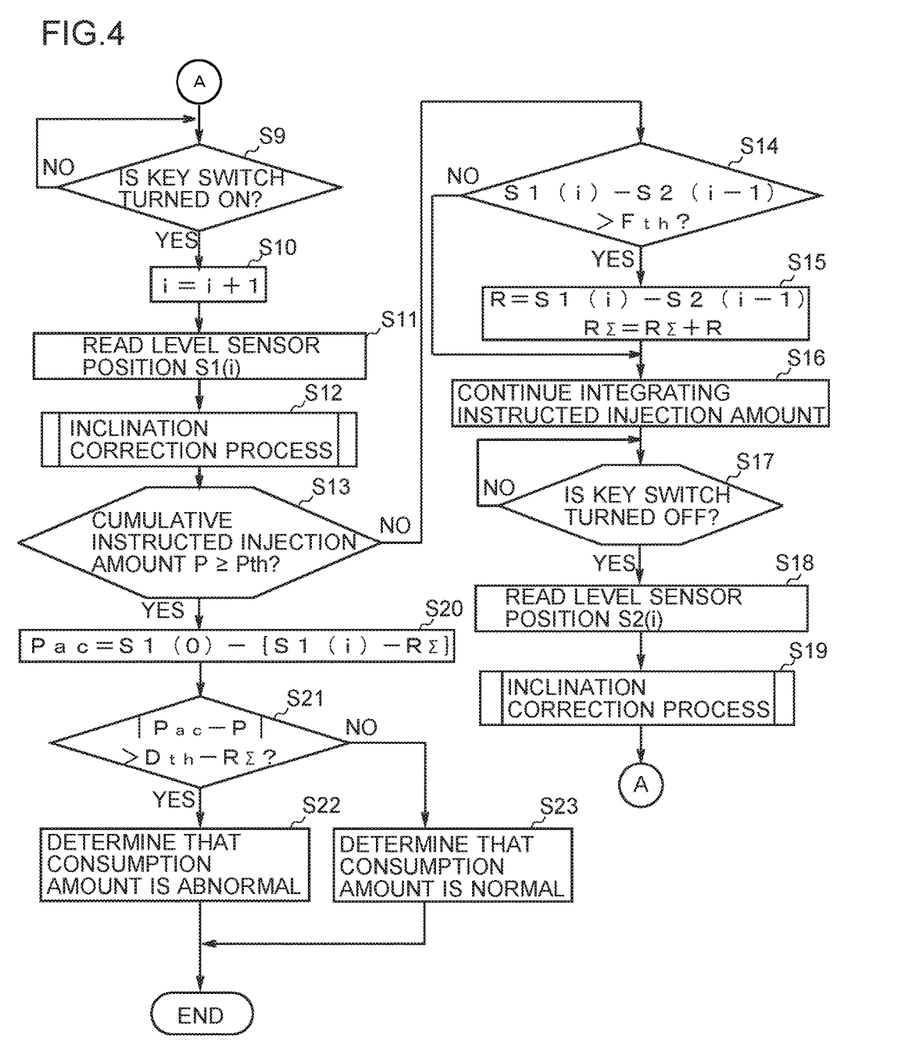
FIG. 4 is another flowchart illustrating the control process of the SCR system of FIG. 1.

Thereafter, as illustrated in FIG. 4, the SCR system 1 stands by until the key switch 13 is turned on again in Step S9. Upon turning on of the key switch 13, i is incremented in Step S10. Then, the level sensor position $S1(i)$ is read in Step S11. In Step S12, the inclination correction is carried out.

In Step S13, the consumption amount abnormality determining unit 36 determines whether the cumulative instructed injection amount P calculated by the cumulative instructed injection amount calculating unit 34 has reached or exceeded the preset determination amount Pth.

If the determination in Step S13 is NO, i.e., if the cumulative instructed injection amount P has not reached the determination amount Pth, then it is determined in Step S14 whether the value obtained by subtracting the level sensor position $S1(i)$ of the current key-on instance from the level sensor position $S2(i-1)$ of the previous key-off instance is greater than a preset replenish threshold Fth. In other words, it is determined whether the urea solution has been replenished within a period from the previous key-off instance to the current key-on instance. If the determination in Step S14 is NO, i.e., if the urea solution has not been replenished, the processing proceeds to Step S16.

If the determination in Step S14 is YES, i.e., if the urea solution has been replenished, then a replenish amount R is calculated in Step S15. The replenish amount R is obtained by subtracting the level sensor position $S1(i)$ of the current key-on instance from the level sensor position $S2(i-1)$ of the previous key-off instance. A cumulative replenish amount $R_\Sigma$ is calculated by integrating the replenish amount R. Then, the processing proceeds to Step S16.

In Step S16, the instructed injection amount continues to be integrated. In Step S17, the SCR system 1 stands by until the key switch 13 is turned off. Upon turning off of the key switch 13, the level sensor position $S2(i)$ is read in Step S18. The inclination correction is carried out in Step S19, and the processing returns to Step S9.

If the determination in Step S13 is YES, i.e., if the cumulative instructed injection amount P has exceeded the determination amount Pth, then the actual injection amount calculating unit 35 calculates an actual injection amount Pac in Step S20. The actual injection amount Pac is obtained by subtracting, from the initial level sensor position $S1(0)$, the value obtained by subtracting the cumulative replenish amount $R_\Sigma$ from the current level sensor position $S1(i)$.

In Step S21, the consumption amount abnormality determining unit 36 determines whether the absolute value of the value obtained by subtracting the cumulative instructed injection amount P from the actual injection amount Pac is greater than a preset threshold Dth. If the determination in Step S21 is YES, this means that the deviation of the actual injection amount Pac from the cumulative instructed injection amount P is large. Thus, it is determined in Step S22 that the consumption amount is abnormal, and processing at the time of abnormality, such as lighting up a fault lamp, is carried out. Then, the processing proceeds to "End." If the determination in Step S21 is NO, this means that the deviation of the actual injection amount Pac from the cumulative instructed injection amount P is small. Thus, it is determined in Step S23 that the consumption amount is normal, and the processing proceeds to "End."

Figure 5:
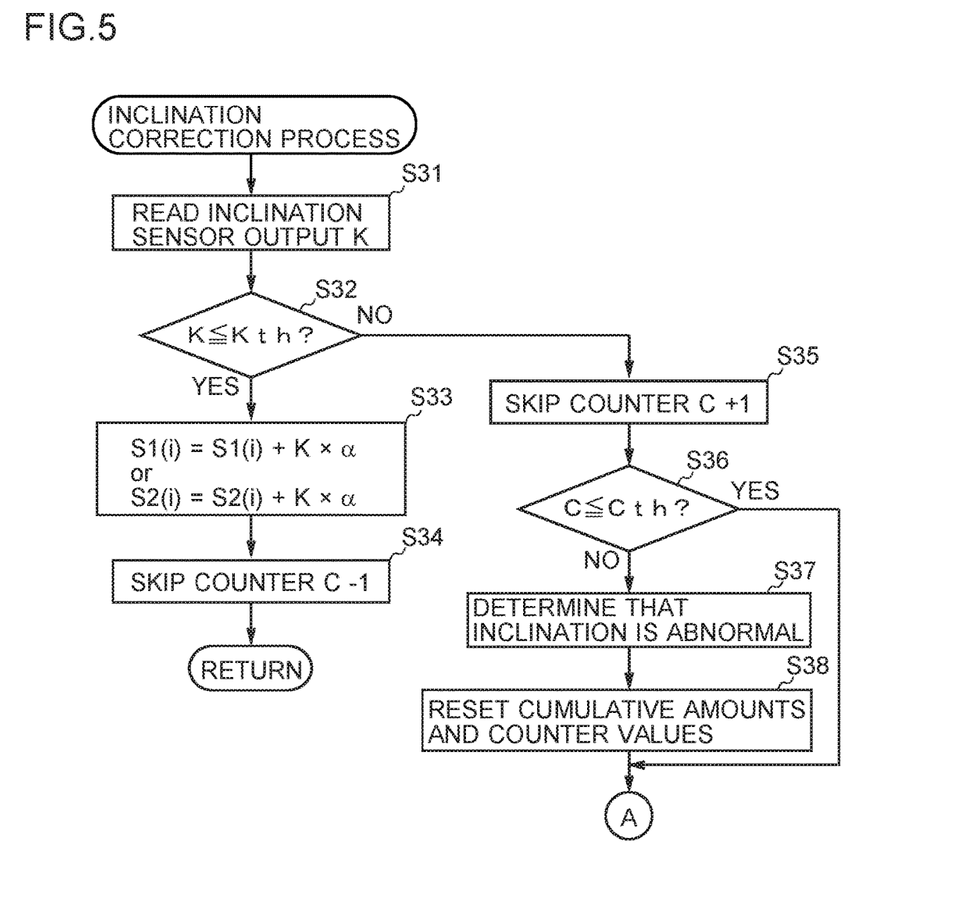
FIG. 5 is a flowchart illustrating a control process of inclination correction in FIGS. 3 and 4.

In the inclination correcting process, as illustrated in FIG. 5, the inclination correcting unit 38 reads the angle K of inclination from an output of the inclination sensor 37 in Step S31. In Step S32, the inclination abnormality determining unit 39 determines whether the angle K of inclination is no greater than a preset threshold angle Kth.

If the determination in Step S32 is YES, it is determined that the angle K of inclination is within a normal range. In Step S33, the inclination correcting unit 38 substitutes, into $S1(i)$ (or $S2(i)$), the corrected value. The corrected value is obtained by adding a value, which is obtained by multiplying the angle K of inclination by the correction coefficient α, to the detected level sensor position $S1(i)$ (or $S2(i)$). In the process below, calculation is carried out with the use of the corrected level sensor position $S1(i)$ (or $S2(i)$). In Step S34, a skip counter C is decremented, and the processing is returned.

If the determination in Step S32 is NO, the skip counter C is incremented in Step S35. Then, it is determined in Step S36 whether the skip counter C is no greater than a preset threshold count Cth. If the determination in Step S36 is YES, the processing returns to Step S9 of FIG. 4.

If the determination in Step S36 is NO, i.e., if the number of times the angle K of inclination has exceeded the threshold angle Kth exceeds a threshold Cth, the inclination correcting unit 38 determines in Step S37 that the inclination is abnormal, and carries out abnormality processing, such as lighting up a fault lamp. Then, in Step S38, the cumulative amounts and the counter values are reset to their initial states. Thereafter, the processing returns to Step S9 of FIG. 4.

As described above, the SCR system 1 of this embodiment includes the inclination sensor 37 for detecting the angle of inclination of the urea solution tank 4 relative to the horizontal plane, and the inclination correcting unit 38 that corrects the level of the liquid surface of the urea solution, which is detected by the detecting unit 32 on the basis of the position of the float 31, in accordance with the angle of inclination detected by the inclination sensor 37.

The SCR system 1 includes the inclination sensor 37 and the inclination correcting unit 38. Therefore, even when the urea solution tank 4 is inclined, the level of the liquid surface of the urea solution when the urea solution tank 4 is disposed horizontally can be estimated by making a correction in accordance with the angle of inclination. Thus, the level of the liquid surface of the urea solution can be detected accurately. As a result, even when a vehicle is parked in an inclined manner, for example, the level of the liquid surface of the urea solution can be detected accurately. An erroneous determination or the like in determining the consumption amount abnormality can be suppressed.

The present invention is not limited to the above-described embodiments, and various modifications can be made within the scope that does not depart from the spirit of the present invention.

The invention claimed is:

1. A selective catalytic reduction system comprising:
a selective catalytic reduction device provided on an exhaust pipe of an engine;
a urea solution tank configured to store a urea solution;
a dosing valve disposed on the exhaust pipe upstream of the selective catalytic reduction device and configured to inject urea solution into the exhaust pipe;
a float urea solution level sensor provided in the urea solution tank and including a float configured to follow a liquid surface of the urea solution in the urea solution tank;
an inclination sensor configured to detect an angle of inclination of the urea solution tank relative to a horizontal plane; and
an electronic controller programmed to execute control of:
a detecting unit configured to detect a position of the float to detect a level of the liquid surface of the urea solution stored in the urea solution tank;
a urea solution injection controlling unit configured to control an injection amount of the urea solution injected through the dosing valve in accordance with an amount of NOx emitted from the engine; and
an inclination correcting unit configured to calculate a corrected level of the liquid surface of the urea solution by correcting the detecting level of the liquid surface of the urea solution, in accordance with the angle of inclination detected by the inclination sensor.

2. The selective catalytic reduction system according to claim 1, wherein the electronic controller is further programmed to execute control of:
an inclination abnormality determining unit configured to determine that inclination is abnormal when the angle of inclination detected by the inclination sensor is greater than a preset threshold angle.

3. The selective catalytic reduction system according to claim 1, wherein the electronic controller is further programmed to execute control of:
a cumulative instructed injection amount calculating unit configured to obtain a cumulative instructed injection amount, the cumulative instructed injection amount being a cumulative value of an instructed injection amount of the urea solution instructed by the urea solution injection controlling unit;
an actual injection amount calculating unit configured to obtain an actual injection amount of the urea solution based on the level of the liquid surface of the urea solution corrected by the inclination correcting unit; and a consumption amount abnormality determining unit configured to determine that a consumption amount is abnormal when a deviation of the actual injection amount from the cumulative instructed injection amount is greater than a predetermined value.

4. A selective catalytic reduction sensor, comprising:
a float urea solution level sensor provided in a urea solution tank, the urea solution tank being configured to store a urea solution that is used to purify exhaust gas of an engine, the float urea solution level sensor including a float configured to follow a liquid surface of the urea solution in the urea solution tank;
an inclination sensor configured to detect an angle of inclination of the urea solution tank relative to a horizontal plane; and
an electronic controller programmed to execute control of:
a detecting unit configured to detect a position of the float to detect a level of the liquid surface of the urea solution stored in the urea solution tank; and
an inclination correcting unit configured to calculate a corrected level of the liquid surface of the urea solution by correcting the detected level of the liquid surface of the urea solution, in accordance with the angle of inclination detected by the inclination sensor.

5. The selective catalytic reduction sensor according to claim 4, wherein the electronic controller is further programmed to execute control of:
an inclination abnormality determining unit configured to determine that inclination is abnormal when the angle of inclination detected by the inclination sensor is greater than a preset threshold angle.

6. A float level sensor, comprising:
a float provided in a tank, the tank being configured to store a liquid, the float being configured to follow a liquid surface of the liquid in the tank;
an inclination sensor configured to detect an angle of inclination of the tank relative to a horizontal plane; and
an electronic controller programmed to execute control of:
a detecting unit configured to detect a position of the float to detect a level of the liquid surface of the liquid stored in the tank; and
an inclination correcting unit configured to calculate a corrected level of the liquid surface of the urea solution by correcting the detected level of the liquid surface of the liquid, in accordance with the angle of inclination detected by the inclination sensor.

7. The float level sensor according to claim 6, wherein the electronic controller is further programmed to execute control of:
an inclination abnormality determining unit configured to determine that inclination is abnormal when the angle of inclination detected by the inclination sensor is greater than a preset threshold angle.

8. The selective catalytic reduction system according to claim 2, wherein the electronic controller is further programmed to execute control of:
a cumulative instructed injection amount calculating unit configured to obtain a cumulative instructed injection amount, the cumulative instructed injection amount being a cumulative value of an instructed injection amount of the urea solution instructed by the urea solution injection controlling unit;

an actual injection amount calculating unit configured to obtain an actual injection amount of the urea solution based on the level of the liquid surface of the urea solution corrected by the inclination correcting unit; and a consumption amount abnormality determining unit configured to determine that a consumption amount is abnormal when a deviation of the actual injection amount from the cumulative instructed injection amount is greater than a predetermined value.

9. The selective catalytic reduction system according to claim 1, wherein the float urea solution level sensor is provided at a position offset from a center of the urea solution tank when viewed from above.

10. The selective catalytic reduction system according to claim 1, wherein the inclination sensor is disposed on an upper portion of the urea solution tank.

11. The selective catalytic reduction system according to claim 1, wherein the inclination sensor is disposed on a member that inclines along with the urea solution tank.

12. The selective catalytic reduction system according to claim 1, wherein the engine is a diesel engine.

13. The selective catalytic reduction sensor according to claim 4, wherein the float urea solution level sensor is provided at a position offset from a center of the urea solution tank when viewed from above.

14. The selective catalytic reduction sensor according to claim 4, wherein the inclination sensor is disposed on an upper portion of the urea solution tank.

15. The selective catalytic reduction sensor according to claim 4, wherein the inclination sensor is disposed on a member that inclines along with the urea solution tank.

16. The selective catalytic reduction sensor according to claim 4, wherein the engine is a diesel engine.

17. The float level sensor according to claim 6, wherein the float is provided at a position offset from a center of the tank when viewed from above.

18. The float level sensor according to claim 6, wherein the inclination sensor is disposed on an upper portion of the tank.

19. The float level sensor according to claim 6, wherein the inclination sensor is disposed on a member that inclines along with the tank.

* * * * *